(12) United States Patent
Chen

(10) Patent No.: US 9,312,675 B2
(45) Date of Patent: Apr. 12, 2016

(54) JUNCTION BOX AUXILIARY SECURING STRUCTURE

(71) Applicant: Yi-Yuan Chen, Kinmen County (TW)

(72) Inventor: Yi-Yuan Chen, Kinmen County (TW)

( * ) Notice: Subject to any disclaimer, the term of this patent is extended or adjusted under 35 U.S.C. 154(b) by 0 days.

(21) Appl. No.: 14/525,276

(22) Filed: Oct. 28, 2014

(65) Prior Publication Data

US 2015/0129402 A1     May 14, 2015

(30) Foreign Application Priority Data

Nov. 13, 2013   (TW) ............................... 102221204 U

(51) Int. Cl.
*H02G 3/14*     (2006.01)
*H02G 3/18*     (2006.01)
*H02G 3/08*     (2006.01)

(52) U.S. Cl.
CPC ................ *H02G 3/14* (2013.01); *H02G 3/081* (2013.01); *H02G 3/18* (2013.01)

(58) Field of Classification Search
USPC .......................................................... 174/53
See application file for complete search history.

(56) References Cited

U.S. PATENT DOCUMENTS

| | | | | |
|---|---|---|---|---|
| 6,943,295 B2 * | 9/2005 | Herth | ....................... | H02G 3/10 174/50 |
| 7,495,170 B2 * | 2/2009 | Dinh | ...................... | H02G 3/123 174/135 |
| 8,124,872 B2 * | 2/2012 | Vigorito | ............ | B29C 45/14311 174/50 |
| 8,328,150 B2 * | 12/2012 | Collins | .................. | H02G 3/126 174/58 |

\* cited by examiner

*Primary Examiner* — Dhirubhai R Patel

(57) ABSTRACT

The invention is relative to a junction box auxiliary securing structure having an auxiliary securing plate mounted in the junction box, and a switch base mounted securely on the auxiliary securing plate. The auxiliary securing plate extends from outside to inside, and oppositely defines long slots, short slots at two sides thereof, respectively, and a central opening formed at a center thereof. The four corners of the central opening have securing tongues slantly extending therefrom and toward a center of the auxiliary securing plate. Two sides of the switch base have a plurality of first fixing holes and a plurality of second fixing holes, respectively. The first fixing holes are corresponding to the long slots of the auxiliary securing plate, and the second fixing holes are corresponding to the short slots of the auxiliary securing plate.

5 Claims, 5 Drawing Sheets

JUNCTION BOX AUXILIARY SECURING STRUCTURE

BACKGROUND OF THE INVENTION

1. Field of the Invention

The invention relative to a junction box auxiliary securing structure, particularly, to a junction box auxiliary securing structure that avoiding the drawback of being incapable of securing to a switch base due to rustiness of junction box.

2. Description of the Related Art

As illustrated in FIGS. 1, 2, a household electronic switch base (or electric socket) 1 is securely mounted in a junction box 2 embedding in a wall W, the junction box 2 has two opposite sides having mounting tabs 21 extending correspondingly, a center of the switch base 1 is adapted to mount an electronic switch 3, the two sides of the switch base 1 correspond to mounting tabs 21 with fixing holes 11 of the junction box 2, the switch base 1 is secured by fixing elements S mounting through the fixing holes 11 of the switch base 1 and mounting the switch base 1 securely to the junction box 2. An outside of the switch base 1 is further covered with a decorative cap 12.

With aforesaid structure, the switch base 1 is securely mounted to the junction box 2, however, the junction box 2 is normally made of metal and is easily rusted. Once the junction box 2 has rustiness, the mounting tabs 21 of the junction box 2 will be easily broken. If the mounting tabs 21 of the junction box 2 broken, the switch base 1 is not secured and may be drop off from the junction box 2 and hanging on the junction box 2 (or the wall W). This causes inconvenience when using switch base 1, and even more, causes danger of getting an electric shock.

Concerning to the structure of the conventional junction box 2 having drawbacks as aforesaid, providing a security structure for switch base 1 in situation of the junction box 2 in rustiness is becoming even more important.

SUMMARY OF THE INVENTION

The objective of the invention is to provide a junction box auxiliary securing structure, thereby to overcome the drawback of conventional junction boxes being incapable of securing to the switch base due to rustiness.

To achieve the objective, the invention provides a junction box auxiliary securing structure that comprises an auxiliary securing plate mounted on the junction box, and a switch base mounted securely on the auxiliary securing plate. The auxiliary securing plate, from outside to inside, oppositely defines long slots, short slots at two sides thereof, respectively, and a central hole formed at a center thereof. The four corners of the central hole have securing tongues slantly extending therefrom and toward a center of the auxiliary securing plate. Two sides of the switch base have outer fixing holes and inner fixing holes, respectively. The outer fixing holes are corresponding to the long slots of the auxiliary securing plate, the inner fixing holes are corresponding to the short slots of the auxiliary securing plate.

The advantage of the invention is that: with implementation of the auxiliary securing plate between the junction box and the switch base for mounting the switch base, the drawback of being incapable of mounting the switch base due to rustiness of the junction box is therefore avoid.

DETAILED DESCRIPTION OF THE INVENTION

Figure 1:
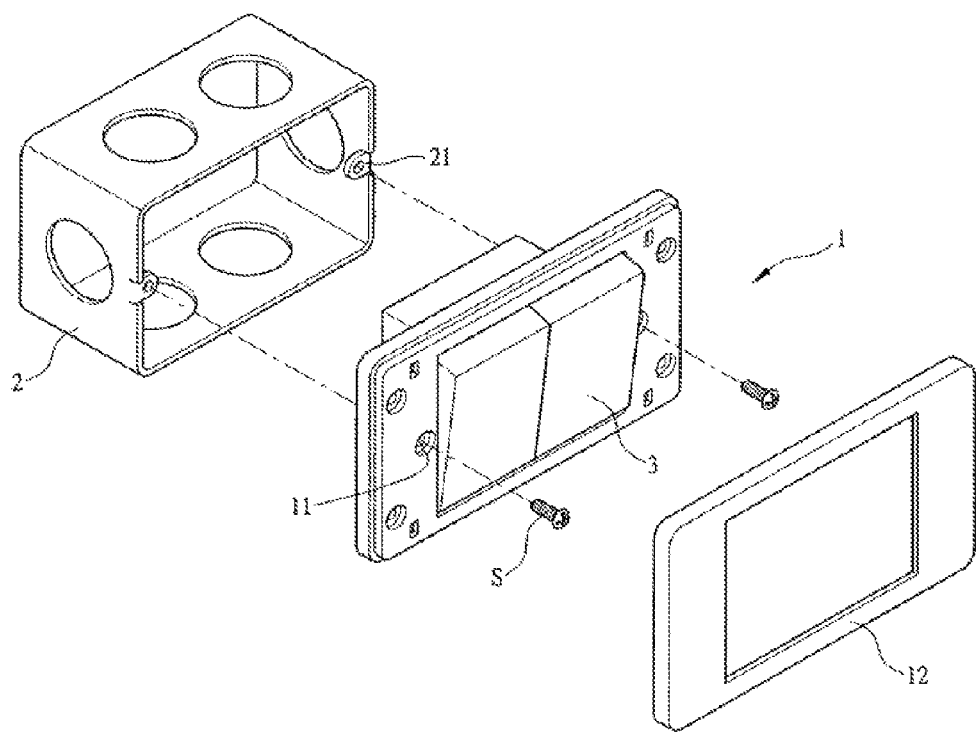
FIG. 1 is an exploded view of a conventional junction box and switch base.
Figure 2:
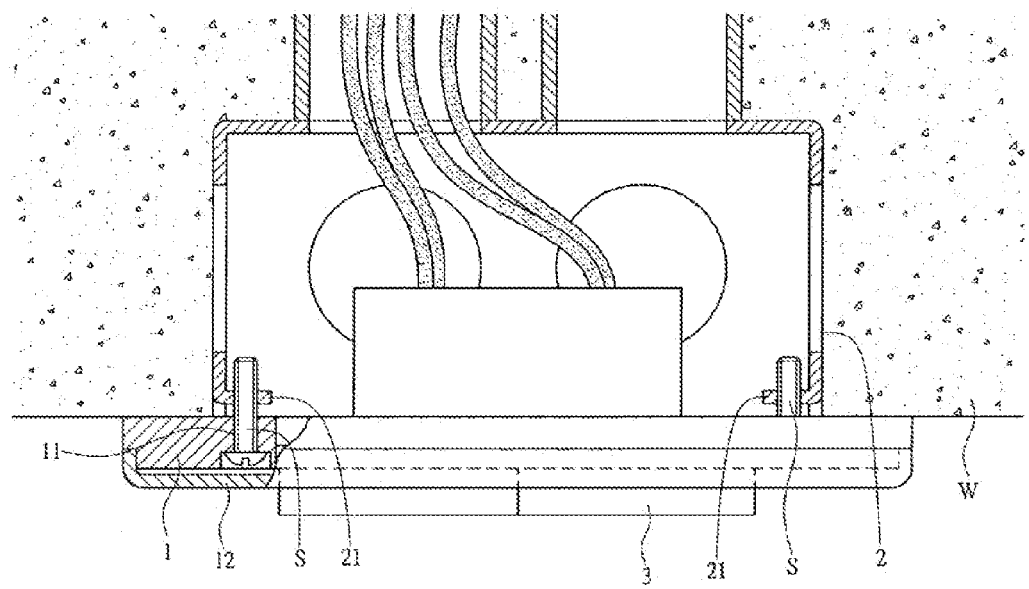
FIG. 2 is a sectional view of a conventional junction box and switch base.
Figure 3:
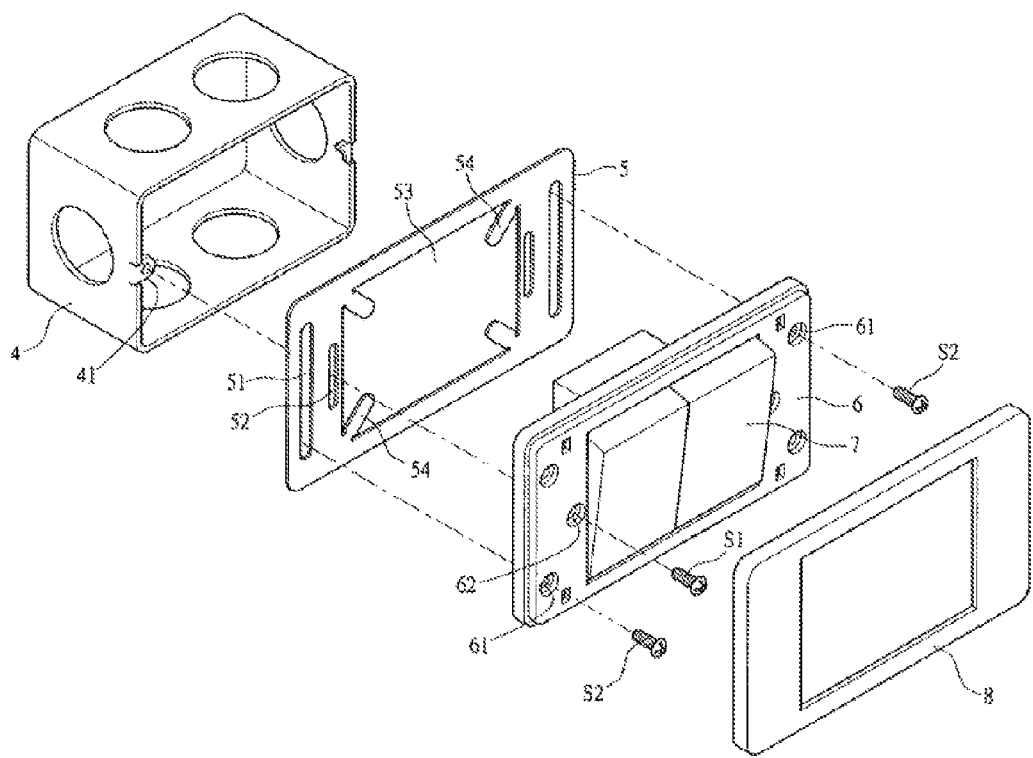
FIG. 3 is an exploded view of the junction box auxiliary securing structure of the invention.

With reference to FIG. 3, the junction box auxiliary securing structure of the invention comprises an auxiliary securing plate 5 mounted on the junction box 4 and a switch base 6 mounted securely on the auxiliary securing plate 5.

As illustrated in FIG. 3, 4, the auxiliary securing plate 5 is mounted in an outer side of the junction box 4. The auxiliary securing plate 5, from outside to inside, oppositely defines long slots 51, short slots 52 at two sides thereof, respectively, and a central hole 53 formed at a center thereof. The four corners of the central hole 53 have securing tongues 54 slantly extending therefrom and toward a center of the auxiliary securing plate 5. The central hole 53 is for mounting the switch 7.

As illustrated in FIG. 3, two sides of the switch base 6 has outer fixing holes 61 and inner fixing holes 62, respectively, the outer fixing holes 61 are corresponding to the long slots 51 of the auxiliary securing plate 5, the inner fixing holes 62 are corresponding to the short slots 52 of the auxiliary securing plate 5. The center of the switch base 6 is mounted with a switch 7. An outside of the switch base 6 is covered with a decorative cap 8.

Figure 4:
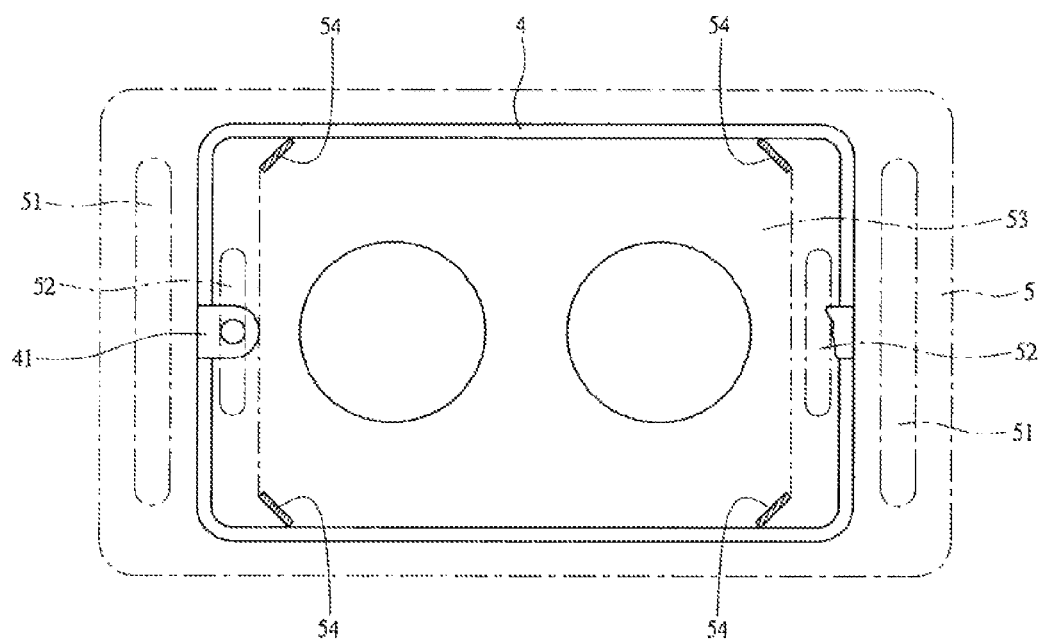
FIG. 4 is a sketch view that illustrates a combination of the junction box and the auxiliary securing plate of the invention.
Figure 5:
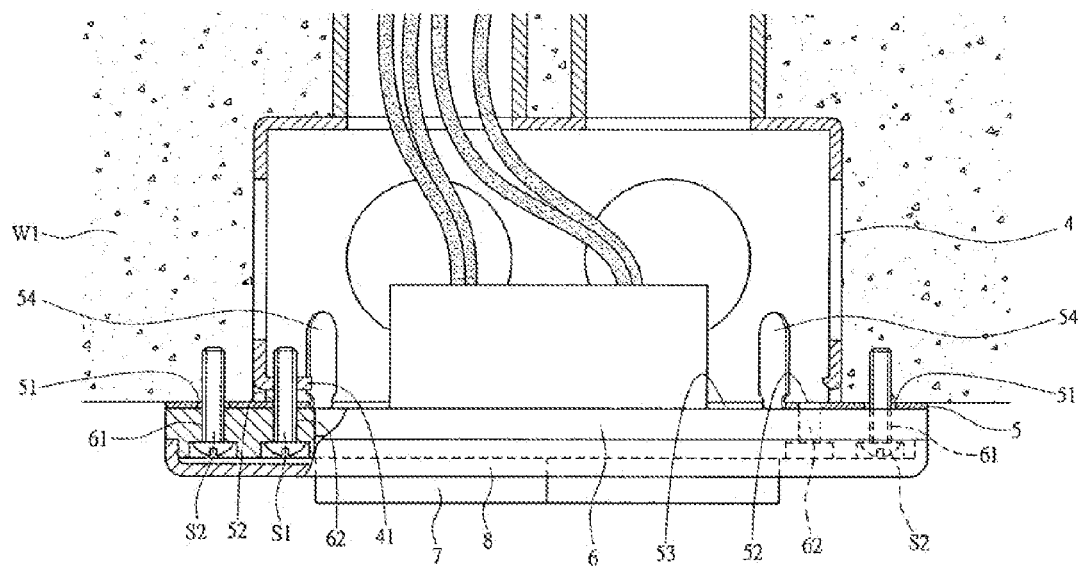
FIG. 5 is a sectional view of the junction box auxiliary securing structure of the invention.

As illustrated in FIGS. 3, 4 and 5, the invention is functioned in situation that the junction box 4 is rusted. When any one of the mounting tabs 41 of the junction box 4 broken due to rustiness, the securing tongues 54 in the four corners of the central hole 53 in the auxiliary securing plate 5 are bent to deformed toward the junction box 4. Such that, when the auxiliary securing plate 5 covers on the junction box 4, the bent securing tongues 54 engage with the junction box 4 in four corners of the junction box 4, thereby to secure the auxiliary securing plate 5 at an outside of the junction box 4 and to cover the junction box 4. Afterward, the switch base 6 is secured by fixing elements 51 that extend through the inner fixing holes 62 of the switch base 6 and the short slots 52 of the auxiliary securing plate 5, so as to mount the switch base 6 and auxiliary securing plate 5 securely with unrusty mounting tabs 41 of the junction box 4. Other fixing elements S2 extend through outer fixing holes 61 of the switch base 6 and the long slots 51 of the auxiliary securing plate 5, so as to mount the switch base 6 and the auxiliary securing plate 5 securely on the wall W1. In this manner, the switch base 6 is securely mounted on a rusty junction box 4.

The advantage of the invention is that, with implementation of the auxiliary securing plate 5 between the junction box 4 and the switch base 6, the auxiliary securing plate 5 is engaged with the junction box 4 by the securing tongues 54, meanwhile the auxiliary securing plate 5 is secured with the switch base 6, therefore to avoid the drawback of being incapable of mounting the switch base 6 due to rusty junction box 4.

What is claimed is:

1. A junction box auxiliary securing structure, comprises an auxiliary securing plate mounted on the junction box, and a switch base mounted securely on the auxiliary securing plate; the auxiliary securing plate extends from outside to inside, oppositely defines long slots, short slots at two sides thereof, respectively, and a central opening formed at a center thereof; the four corners of the central opening have securing tongues slantly extending therefrom and toward a center of the auxiliary securing plate; two sides of the switch base have a plurality of first fixing holes and a plurality of second fixing holes, respectively; the first fixing holes are corresponding to the long slots of the auxiliary securing plate, the second fixing holes are corresponding to the short slots of the auxiliary securing plate.

2. The junction box auxiliary securing structure as claimed in claim 1, wherein the central opening of the auxiliary securing plate is for mounting a switch.

3. The junction box auxiliary securing structure as claimed in claim 1, wherein a center of the switch base is mounted with a switch, an outside of the switch base is covered with a decorative cap.

4. The junction box auxiliary securing structure as claimed in claim 1, wherein the auxiliary securing plate is engaged with the junction box by the securing tongue.

5. The junction box auxiliary securing structure as claimed in claim 1, wherein the switch base and the auxiliary securing plate is mounted securely on the wall by fixing elements extending through the first fixing holes of the switch base and long slots of the auxiliary securing plate.

* * * * *